US012679410B1

(12) United States Patent
Agrawal et al.

(10) Patent No.: US 12,679,410 B1
(45) Date of Patent: Jul. 14, 2026

(54) AUTO-EXECUTING DRIVER EXPECTATIONS USING AUTONOMOUS VEHICLES

(71) Applicant: INTERNATIONAL BUSINESS MACHINES CORPORATION, Armonk, NY (US)

(72) Inventors: Tushar Agrawal, West Fargo, ND (US); Martin G. Keen, Cary, NC (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 960 days.

(21) Appl. No.: 17/929,793

(22) Filed: Sep. 6, 2022

(51) Int. Cl.
B60W 60/00 (2020.01)
B60W 40/09 (2012.01)
(Continued)

(52) U.S. Cl.
CPC ........ B60W 60/0015 (2020.02); B60W 40/09 (2013.01); B60W 50/0097 (2013.01);
(Continued)

(58) Field of Classification Search
CPC ......... B60W 60/0015; B60W 60/0051; B60W 40/09; B60W 50/0097; B60W 50/14; B60W 2556/10
See application file for complete search history.

(56) References Cited

U.S. PATENT DOCUMENTS 6,580,973 B2    6/2003  Leivian
7,487,074 B2    2/2009  Ohtsu
                (Continued)

FOREIGN PATENT DOCUMENTS

CN    104181819 A    12/2014
CN    104181819 B    12/2014
CN    110464368 A    11/2019

OTHER PUBLICATIONS

Anonymous, "Breakthrough Technology for the Brain," Neuralink. com [datasheet], [accessed on Sep. 2, 2022], 3 pages, Retrieved from the Internet: <URL: https://neuralink.com/>.
(Continued)

*Primary Examiner* — Wade Miles
*Assistant Examiner* — Zachary Joseph Wallace
(74) *Attorney, Agent, or Firm* — Steven M. Bouknight

(57) ABSTRACT

An embodiment for executing a driver's expectations in view of contextual data and driver expectation data to improve driver safety. The embodiment may automatically establish a connection between an autonomous vehicle and a brain computer interface (BCI) device worn by a driver of the autonomous vehicle. The embodiment may automatically utilize sensors and the BCI device to gather contextual data, automatically process the contextual data, and conduct predictive analysis of correlated driver behavior. The embodiment may automatically detect a traffic context and generate a predicted driver expectation for the traffic context. The embodiment may, in response to detecting that the predicted driver expectation for the traffic context is safe, automatically execute the predicted driver expectation. The embodiment may, in response to detecting that the predicted driver expectation is unsafe, automatically execute a safety remedial action.

17 Claims, 3 Drawing Sheets

(51) Int. Cl.
 B60W 50/00 (2006.01)
 B60W 50/14 (2020.01)
 G06F 3/01 (2006.01)

(52) U.S. Cl.
 CPC ........ B60W 50/14 (2013.01); B60W 60/0051 (2020.02); G06F 3/015 (2013.01); B60W 2556/10 (2020.02)

(56) References Cited

U.S. PATENT DOCUMENTS

| | | | |
|---|---|---|---|
| 2005/0110348 | A1 | 5/2005 | Hijikata |
| 2007/0124029 | A1 | 5/2007 | Hattori |
| 2021/0221404 | A1* | 7/2021 | Reiner ................. G05D 1/0055 |
| 2022/0050524 | A1* | 2/2022 | Hassani ............... B60W 40/08 |
| 2022/0095975 | A1* | 3/2022 | Aluf ....................... A61B 3/113 |
| 2022/0306155 | A1* | 9/2022 | Zimmermann ... B60W 60/0013 |
| 2024/0071220 | A1* | 2/2024 | Perumalla ......... B60W 60/0017 |
| 2025/0094855 | A1* | 3/2025 | Chasnov ................ G06N 3/006 |

OTHER PUBLICATIONS

Anonymous, "IBM IoT Connected Vehicle Insights," IBM.com [overview], [accessed on Sep. 2, 2022], 6 pages, Retrieved from the Internet: <URL: https://www.ibm.com/products/iot-for-automotive>.

Anonymous, "Smart city technology revolutionizes infrastructure," IBM.com [online], [accessed on Sep. 2, 2022], 7 pages, Retrieved from the Internet: < URL: https://www.ibm.com/industries/government/infrastructure-citizen-services>.

Artifice, et al. "Embodied Cognitive Architecture to Support Driver Performance." 2018 International Conference on Intelligent Systems (IS), Sep. 25-27, 2018 [accessed on Jul. 8, 2022], pp. 877-885, IEEE, Funchal, PT, DOI: 10.1109/IS.2018.8710474, Retrieved from the Internet: <URL: https://ieeexplore.ieee.org/document/8710474>.

Banks et al., "Analysis of driver roles: Modelling the changing role of the driver in automated driving systems using EAST." Theoretical issues in ergonomics science 20.3 (2019): 284-300.

Nield, "There's A Pretty Glaring Issue With Tesla's Autopilot, Says New Study," ScienceAlert [online], Sep. 26, 2021 [accessed on Sep. 2, 2022], 3 pages, Retrieved from the Internet: <URL: https://www.sciencealert.com/study-shows-that-tesla-autopilot-reduces-the-attention-levels-of-drivers >.

Underwood, et al., "Visual search while driving: skill and awareness during inspection of the scene." Transportation Research Part F: Traffic Psychology and Behaviour, Jun. 2002, pp. 87-97, vol. 5, Issue 2, Retrieved from the Internet: <URL: https://www.sciencedirect.com/science/article/abs/pii/S1369847802000086>.

Zhang, et al., "Driving Behavior Based on Big Data Analysis and EEG Data Analysis." Journal of Physics: Conference Series [paper], 2021 [accessed on Aug. 7, 2022], 7 pages, vol. 2066, No. 1, Retrieved from the Internet: <URL: https://iopscience.iop.org/article/10.1088/1742-6596/2066/1/012096>.

* cited by examiner

100

AUTO-EXECUTING DRIVER EXPECTATIONS USING AUTONOMOUS VEHICLES

BACKGROUND

The present application relates generally to improved safety systems for autonomous vehicles, and more particularly, of automatically executing a driver's expectations in view of contextual data and driver expectation data to improve driver safety.

Designs of autonomous vehicles with self-driving capabilities are continuously being improved over time. However, as autonomous vehicles with self-driving capabilities become more prevalent, a large amount of focus is being placed on driver attentiveness and safety.

SUMMARY

According to one embodiment, a method, computer system, and computer program product for automatically executing a driver's expectations in view of contextual data and driver expectation data to improve driver safety is provided. The embodiment may include automatically establishing a connection between an autonomous vehicle, and a brain computer interface (BCI) device worn by a driver of the autonomous vehicle. The embodiment may also include automatically utilizing sensors and the BCI device to gather contextual data. The embodiment may further include automatically processing the contextual data and conducting predictive determinations of correlated driver behavior. The embodiment may also include automatically detecting a traffic context, and continuously detecting and monitoring upcoming traffic environments. The embodiment may further include automatically generating a predicted driver expectation for the traffic context. The embodiment may also include, in response to detecting that the predicted driver expectation for the traffic context is safe, automatically executing the predicted driver expectation The embodiment may also include, in response to detecting that the predicted driver expectation for the traffic context is unsafe, automatically executing a safety remedial action.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
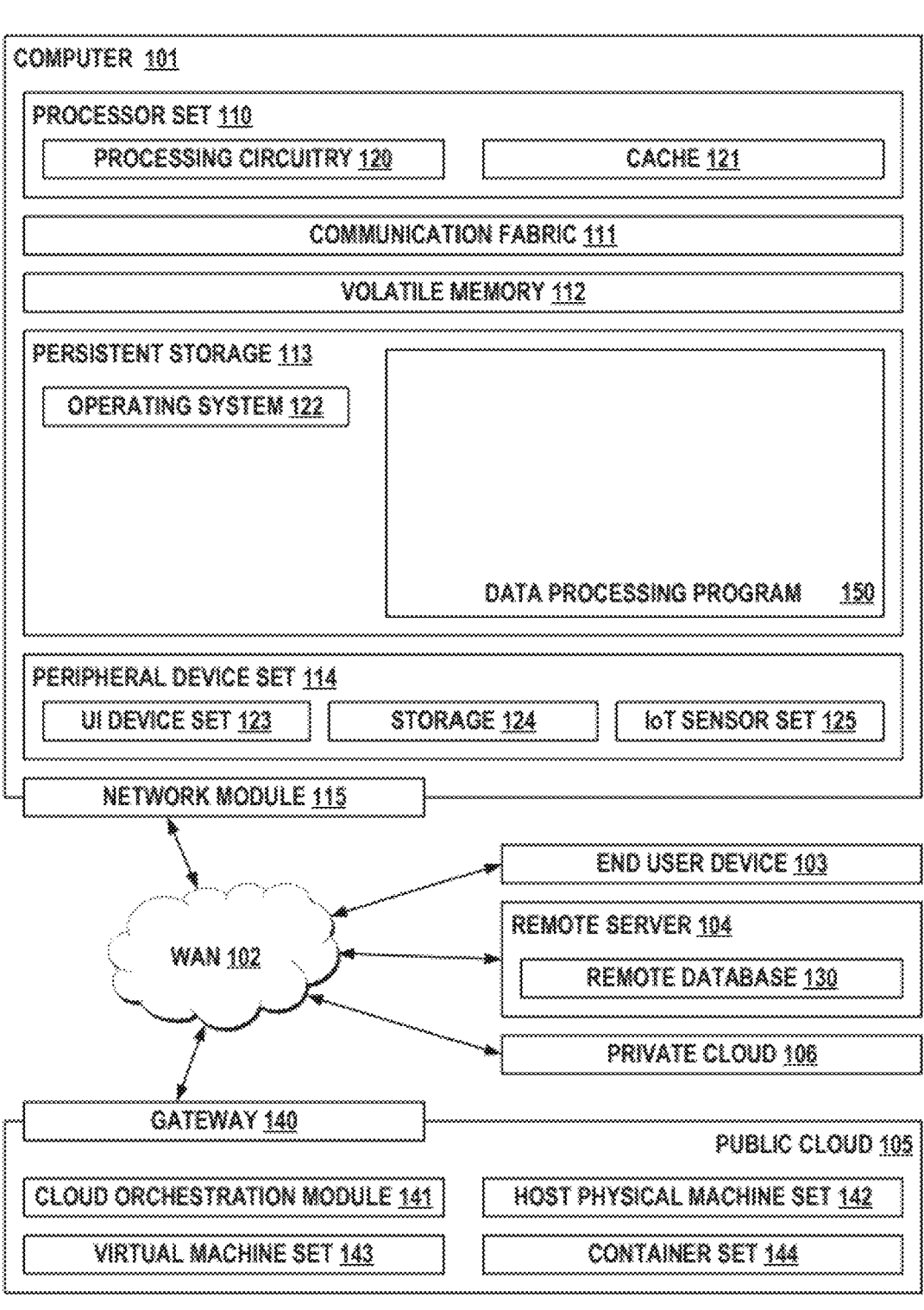
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to improved safety systems for autonomous vehicles, and more particularly, to automatically executing a driver's expectations in view of contextual data and driver expectation data to improve driver safety. The following described exemplary embodiments provide a system, method, and program product to, among other things, automatically establish a connection between an autonomous vehicle and a brain computer interface (BCI) device worn by a driver of the autonomous vehicle, automatically utilize sensors and the BCI device to gather contextual data, automatically process the contextual data and conduct predictive determinations of correlated driver behavior, automatically detect a traffic context, automatically generate a predicted driver expectation for the traffic context, and in response to detecting that the predicted driver expectation for the traffic context is safe, automatically execute the predicted driver expectation. The described exemplary embodiments may then, in response to detecting that the predicted driver expectation is unsafe, automatically execute a safety remedial action. Therefore, the presently described embodiments have the capacity to improve autonomous vehicle driver safety by providing a system that continuously detects and processes subjective driver expectations in view of correlated driver behavior and contextual data to ultimately ensure that the driver's expectations are executed in a safe manner.

As previously described, designs of autonomous vehicles with self-driving capabilities are continuously being improved over time. However, as autonomous vehicles with self-driving capabilities become more prevalent, a large amount of focus is being placed on driver attentiveness and safety. Safety becomes an even greater challenge as autonomous vehicles begin to safely handle and increasing amount of driving situations but still cannot be relied upon to handle all driving situations safely. This creates a dangerous scenario where drivers become increasingly comfortable paying less attention to their driving and relying upon the autonomous vehicle. Managing what tasks are handled by autonomous vehicles and how autonomous vehicles may respond to inattentive drivers is a difficult challenge as driver expectations are a subjective and constantly moving target. In other words, the most appropriate remedial action for an autonomous vehicle to take to promote driver safety is often driver-dependent and constantly changing based on the driver's subjective approach to a given traffic context and context of the vehicle and its surroundings in a given traffic context.

Accordingly, a method, computer system, and computer program product for automatically executing a driver's expectations in view of contextual data and driver expectation data to improve driver safety would benefit many drivers and businesses having any number of employees utilizing autonomous vehicles regularly. The method, system, and computer program product may automatically establish a connection between an autonomous vehicle, and a brain computer interface (BCI) device worn by a driver of the autonomous vehicle. The method, system, computer program product may automatically utilize sensors and the BCI device to gather contextual data. According to one embodiment, the method, system, computer program product may then automatically process the contextual data and conduct predictive determinations of correlated driver behavior. The method, system, computer program product may then automatically detect a traffic context, and continuously detect and monitor upcoming traffic environments. Then, the method, system, computer program product may automatically generate a predicted driver expectation for the traffic context. The method, system, computer program product may then, in response to detecting that the predicted driver expectation for the traffic context is safe, automatically execute the predicted driver expectation. The method, system, computer program product may also, in response to detecting that the predicted driver expectation for the traffic context is unsafe, automatically execute a safety remedial action. In turn, the method, system, computer program product has provided improved methods for automatically executing a driver's expectations in view of contextual data and driver expectation data to improve driver safety. Described embodiments include improved methods for processing data that take into consideration contextual data and use predictive analysis to effectively determine subjective driver expectations and subsequently execute the driver expectations in a safe manner.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as data processing program/ code 150. In addition to data processing code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data processing code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data processing code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in data processing program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the data processing program 150 may be a program capable of automatically establishing a connection between an autonomous vehicle, and a brain computer interface (BCI) device worn by a driver of the autonomous vehicle. Data processing program 150 may then automatically utilize sensors and the BCI device to gather contextual data. Next, data processing program 150 may automatically process the contextual data and conduct predictive analysis or determination of correlated driver behavior. Data processing program 150 may then automatically detect a traffic context, and continuously detect and monitor upcoming traffic environments. Next, data processing program 150 may automatically generate a predicted driver expectation for the traffic context. Data processing program 150 may also, in response to detecting that the predicted driver expectation for the traffic context is safe, automatically execute the predicted driver expectation. Data processing program 150 may then, in response to detecting that the predicted driver expectation for the traffic context is unsafe, automatically execute a safety remedial action. In turn, data processing program 150 has provided improved methods for automatically executing a driver's subjective expectations in view of contextual data and driver expectation data to improve driver safety. Data processing program 150 provides improved driver safety by taking into consideration contextual data and using predictive analysis to effectively determine driver expectations, and then subsequently executing the driver's subjective expectations in a safe manner, outputting a safety remedial action when appropriate.

Figure 2:
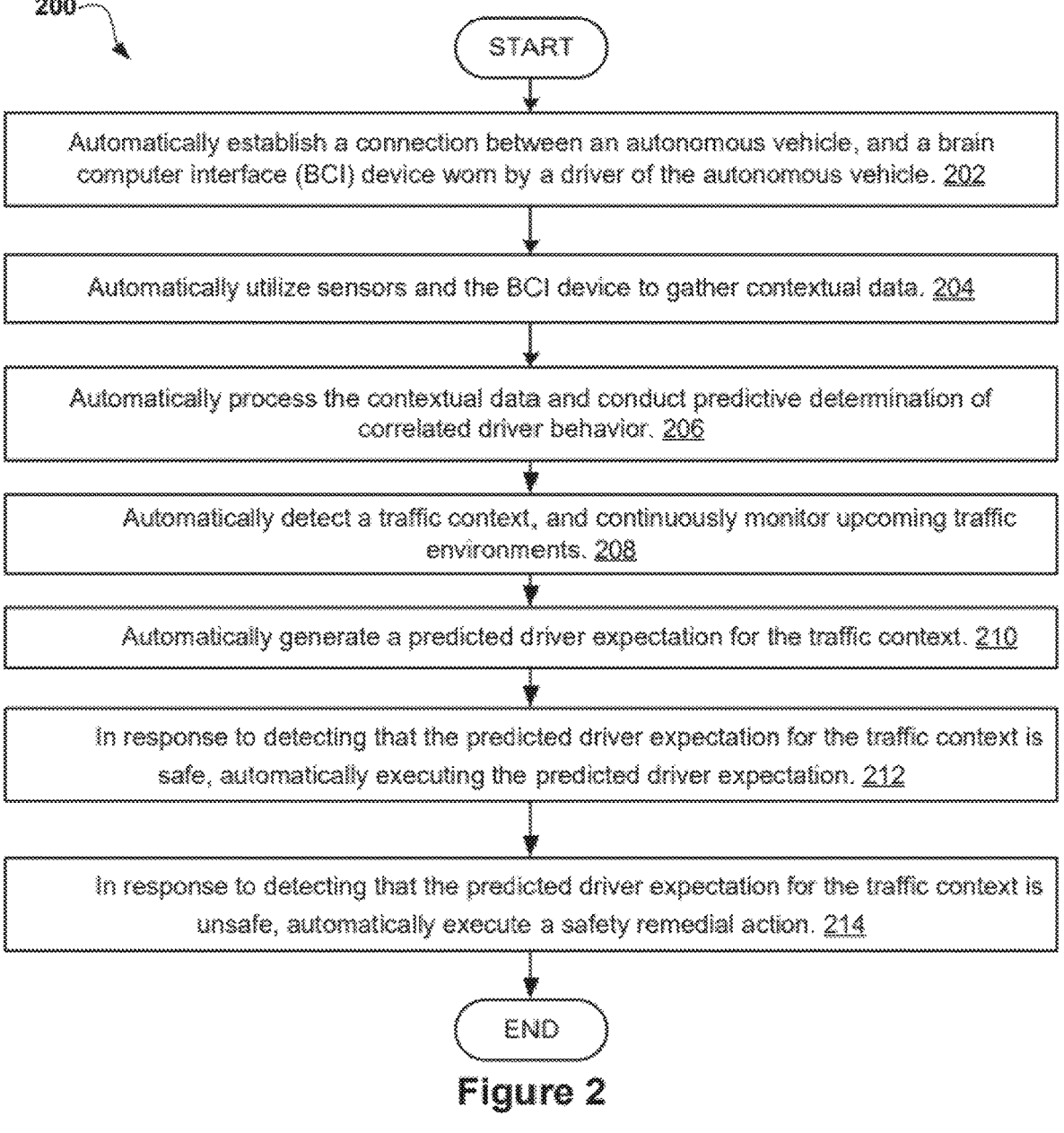
FIG. 2 illustrates an operational flowchart for a process of automatically executing a driver's expectations in view of contextual data and driver expectation data to improve driver safety according to at least one embodiment.
Figure 3:
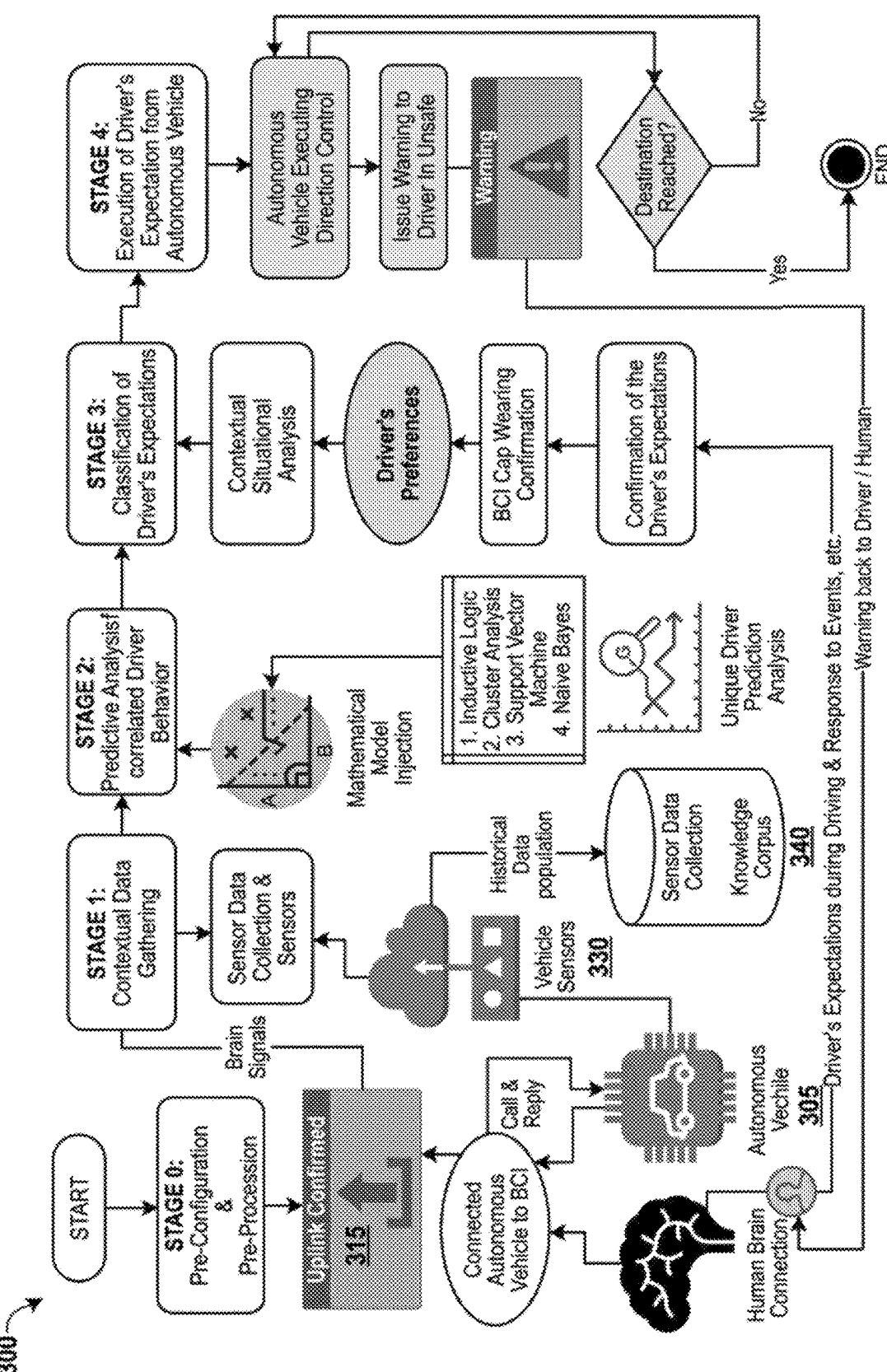
FIG. 3 illustrates a context and flow diagram depicting stages and components usable in an illustrative process of automatically executing a driver's expectations in view of contextual data and driver expectation data to improve driver safety according to at least one embodiment.

Referring now to FIG. 2, an operational flowchart depicting a process 200 for automatically executing a driver's expectations of an autonomous vehicle in view of contextual data and driver expectation data to improve driver safety according to at least one embodiment is provided. FIG. 3 depicts a context and flow diagram 300 depicting illustrative stages and components for performing process 200 described below. Components and functions shown in FIG. 3 will be referenced below in connection with the description of process 200.

At 202, data processing program 150 automatically establishes a connection or uplink 315 between an autonomous vehicle 305, and a brain computer interface (BCI) device worn by a driver of the autonomous vehicle 320 (as shown in FIG. 3). The brain-computer interface device, sometimes called a direct neural interface or a brain-machine interface, may be utilized to monitor and collect brain wave data. The collection of brain wave data may be implemented utilizing electroencephalography (EEG), which is the recording of electrical activity along the scalp produced by the firing of neurons within the brain. EEG may be utilized to monitor and record the brain's spontaneous electrical activity over a period of time, from multiple electrodes placed on the scalp of the user. An event-related potential (ERP) may be measured as part of the user response and generally includes any measured brain response that is directly the result of a thought or perception. In embodiments, the BCI may be in the form of a wearable cap for a driver to wear on the top of their head. At 202, data processing program 150 establishes a connection between the autonomous vehicle and a BCI interface-enabled cap, for example. Any known BCI interface-enabled cap for various machine to human interaction may be suitable. The BCI cap and autonomous vehicle may be configured to communicate wirelessly using, for example, a low latency communication mechanism such as Bluetooth LE, Wi-Fi direct, or near field communication.

At 204, data processing program 150 automatically utilizes sensors 330 (See FIG. 3) and the BCI device to gather contextual data. In the context of this disclosure, the contextual data may include all data related to the autonomous vehicle, the driver's physical and mental state, and the driver's historical driving patterns in the context of a given traffic context or driving environment. To gather the contextual data, data processing program 150 may continuously utilize sensors included in the autonomous vehicle, and may gather data from any useful types of sensors including, for example, light detection and ranging (LIDAR), 3D laser detection, ultrasonic detection, and others. In embodiments, data processing program may be configured to communicate with an autonomous driving agent which, based on feedback from certain sensors, specifically the LIDAR and radar sensors positioned around the circumference of the vehicle, constructs a three-dimensional map in spatial proximity to the vehicle that enables the autonomous driving agent to identify and spatially locate animate and inanimate objects. Other sensors, such as inertial measurement units, gyroscopes, wheel encoders, sonar sensors, motion sensors to perform odometry calculations with respect to nearby moving objects, and exterior facing cameras (e.g., to perform computer vision processing) can provide further contextual information. Contextual data may further include real-world information, GPS data, and driving speed to determine accurately the precise position of nearby vehicles or objects, all while making corrections for nearby animate and inanimate objects. Many of these sensors and systems are known and critical to enabling autonomous vehicles to include self-driving features.

To gather contextual data related to the driver, data processing program 150 utilizes the BCI device to continuously gather brain signal data. Data processing program 150 may determine which gathered signal data is correlated to corresponding human behaviors. Over time, the BCI brain signal data may be used to generate a library of BCI signals that correspond to various driving behaviors or actions, such as pressing on the gas pedal, turning the steering wheel, pressing on the brakes, using a turn signal, etc. The BCI device can also gather brain signals corresponding to the driver's state or attentiveness. For example, the BCI device may gather brain signal data corresponding to a driver being physically interacted with, such as being touched on the shoulder, or otherwise engaged with by another passenger. In another example BCI device can detect brain signals corresponding to a driver that is in pain or is particularly tired. The gathered brain signals can be useful in determining a driver's level of attentiveness. During manual driving, data processing program 150 may continuously monitor driving behavior to store data, including corresponding BCI signals gathered during manual driving, to create a historical driver behavior record. A combination of the sensor data, BCI signals, and manual driving behavior, may all be captured in a corpus and stored within the autonomous vehicle as contextual data.

At 206, data processing program 150 automatically processes the contextual data and conducts predictive analysis of correlated driver behavior. Data processing program 150 utilizes machine learning algorithms to determine patterns of driver behavior using the gathered contextual data and driver behavior records.

In the context of this disclosure, machine learning broadly describes a function of a system that learns from data. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. Examples of machine learning algorithm types that may be used in described embodiments will be further discussed below.

In embodiments, machine learning algorithms that may be used in conjunction with data processing program 150 include inductive logic programming algorithms, cluster analysis algorithms, support vector machine algorithms, and naïve bayes algorithms. Inductive logic programming algorithms are useful for navigating decision trees to arrive at a conclusion. In the driving behavior scenario, data processing program 150 may utilize this type of algorithm to, for example, consider how often a driver makes a lane change, when they make a lane change, and what type of lane change is correlated to certain BCI signals. In another example, data processing program 150 may utilize a cluster analysis algorithm to define clusters of data points that are similar and far from other groups of data points. This could be used to, for example, define a cluster of BCI signals corresponding to a driver looking at their cell phone, or to define another cluster for when the driver is looking around, and so on. In yet another example, data processing program 150 may utilize support vector machine algorithms for finding boundaries of objects and their characteristics. For example, data processing program 150 may use this type of algorithm to define boundaries of a vehicle in front of an autonomous vehicle, and then determine how quickly the driver is responding to the presence of that vehicle. In another example, data processing program 150 may utilize Naïve Bayes classifier algorithms for finding relationships between sets of variables. For example, data processing program 150 may use this type of algorithm to find a relationship between certain BCI signals and different types of driving behaviors that often occur together. In the context of this disclosure, clustering and inductive logic programming would be used in the initial stages to establish what BCI signals are correlated with different driver behaviors. Support vector machine, Naïve Baeys, and cluster analysis would be relied on more heavily in later stages to define dynamic clusters of data points in real time based on the gathered contextual data from the surrounding environment. Utilizing all of these tools ultimately allows data processing program 150 to processes the contextual data and conduct predictive analysis of correlated driver behavior.

At 208, data processing program 150 automatically detects a traffic context, and continuously monitors upcoming traffic environments. In this disclosure, the traffic context represents a current driving environment or an imminent or upcoming driving environment detected by data processing program 150. Data processing program 150 may detect the traffic context using the gathered contextual data and may further detect if the vehicle is being driven manually and identify any possible ambiguities or gaps in the gathered data that would inhibit the ability of data processing program 150 to make an ideal determination or decision regarding automated driving. In the context of this disclosure, an ideal determination or decision may be a determination or decision based upon a preconfigured threshold percentage representing a suitable value for a desired amount of certainty. If an ambiguity or lack of sufficient information to make an ideal determination or decision regarding automated driving is detected, data processing program 150 may be configured to automatically send an urgent signal prompting the driver to put on their BCI device (cap) to capture additional data as needed.

At 210, data processing program 150 automatically generates a predicted driver expectation for the traffic context. In the context of this disclosure, a predicted driver expectation corresponds to the driving action that a given driver would be expected to take in a given driving scenario based upon historical contextual data, BCI signal data and manual driving data. Thus, the predicted driver expectation is subjective to the driver being considered. Data processing program 150 may use probabilistic models to determine the predicted driver expectation for a given context. An exemplary probabilistic model may take into account, for example, driver preference data based on previous driving experiences, driver preference data based on previous driving preferences, driver reaction time to ambiguities in vehicle behavior, driver reaction time to possible impacts due to automated decision making, and various other useful factors or data. The probabilistic model may further employ clustering, cluster analysis, and inductive logic programming (as discussed above) for this purpose. Accordingly, data processing program 150 can utilize the probabilistic model to predict the driver's expectations within a certain level of confidence for a giving traffic context. For example, data processing program 150 may detect imminent heavy traffic in stop-go conditions ahead of a given autonomous vehicle and driver. Based on, driver preference data based on previous driving experiences, driver preference data based on previous driving preferences, driver reaction time to ambiguities in vehicle behavior, driver reaction time to possible impacts due to automated decision making, and various other useful factors or data, data processing program 150 may automatically generated a predicted driver expectation that the autonomous vehicle in this driving context would slow down substantially to a speed of only a few miles per hour as the heavy stop-go traffic is approached.

At 212, data processing program 150, in response to detecting that the predicted driver expectation is safe, automatically executes the predicted driver expectation. In embodiments, a prediction that a given action is "safe" may correspond to a determination that a given action corresponds to a percent probability of being safe that is above a preconfigured threshold value. At 212, data processing program 150 may perform these steps by utilizing a decision engine configured to follow a series of rules to confirm the predicted driver expectation and determine the proper way to execute the predicted driver expectation. For example, an exemplary decision engine may include an exemplary rule that may be summarized with the following: 'If the driver's expectation is to change driving location, and there is a high level of certainty about this expectation, the autonomous vehicle will plan accordingly and start changing its route as per the driver's expectations.' Another exemplary rule may be summarized with the following: 'If the driver's expectation is to maintain the current driving location, and there is a high level of certainty about this expectation, the autonomous vehicle will maintain its current location.' Once data processing program 150 has determined that the predicted driver expectation is safe in view of the gathered contextual data concerning the traffic context and BCI signals from the driver, the decision engine may be used to determine a proper decision to execute the driver expectation. For example, using the scenario discussed in connection with 210, data processing program 150 may detect that the predicted driver expectation of slowing substantially to a speed of only a few miles per hour as the heavy stop-go traffic is approached is safe in view of the current traffic context and the contextual data. In this instance, in the case of manual driving for example, data processing program 150 has determined that the driver is in a state of awareness and control that is sufficient to achieve the predicted driver's expectation of slowing down in time to address the imminent heavy traffic condition ahead. Accordingly, data processing program 150 will execute the predicted driver expectation by actively deciding to not take any further actions and allowing the driver to make the driving decision without any intervention. Alternatively, if the autonomous vehicle is self-driving, it will execute the predicted driver expectation on its own by slowing down in accordance with the predicted driver expectation.

For instances in which the predicted driver expectation is determined to be unsafe (i.e. the percentage probability that a given driver expectation is safe falls below a preconfigured threshold value), data processing program 150 uses a different approach. At 214, in response to detecting that the predicted driver expectation for the traffic context is unsafe, data processing program 150 automatically executes a safety remedial action. For example, considering the scenario discussed above, if an autonomous vehicle is imminently approaching heavy stop-go traffic, data processing program 150 may determine from the BCI signals that the driver is distracted or inattentive and predict that the driver will be unable to carry out the predicted driver expectation of slowing down substantially in a safe or timely manner in view of the contextual traffic data gathered by the sensors and tools within the autonomous vehicle. Once data processing program 150 has predicted that the driver is unable to safely execute the predicted driver expectations for the given traffic context, data processing program 150 will execute a safety remedial action. A safety remedial action may take any suitable form. For example, a safety remedial action may include delivering a warning to the driver that their driving behavior is unsafe and that a corrective action in needed. Another exemplary safety remedial action may include data processing program 150 automatically ensuring that the autonomous vehicle takes control of driving to either execute the driver's expectations safely. In other contexts, data processing program 150 may cause the autonomous vehicle to simply make a safe stop if it's determined that the driver's expectation cannot be safely executed.

FIG. 3 illustrates a context and flow diagram depicting stages and components usable in an illustrative process 300 for automatically executing a driver's expectations in view of contextual data and driver expectation data to improve driver safety according to at least one embodiment. Process 300 includes four stages that correspond to the flowchart depicted in FIG. 2. Stage 0 involves pre-configuration and pre-processing including data processing program 150 automatically establishing a connection or uplink 315 between an autonomous vehicle 305, and a brain computer interface (BCI) device worn by a driver of the autonomous vehicle 305. At stage 1, data processing program 150 gathers contextual data using vehicle sensors 330 (or any other suitable tools). This sensor data may be collected and stored in a knowledge corpus 340. At stage 2, data processing program 150 may conduct predictive analysis of correlated driving behavior using machine learning and algorithms such as those discussed above. At stage 3, data processing program 150 classifies the driver's expectations in view of contextual data and driver's preferences using the decision engine discussed above. As discussed above, data processing program 150 may also determine if additional data is needed from the BCI device to make a highly confident prediction of the driver's expectations and prompt the driver to wear the BCI device as needed. Finally at stage 4, data processing program 150 may execute the driver's expectations or output a safety remedial action as described above. Data processing program 150 may continuously engage in the above-described stages until a destination is reached. This depiction of components is merely illustrative and non-exhaustive. Additional tools or components may be added to a given system as may be desirable to achieve various functions and features described in detail above.

It may be appreciated that the above descriptions demonstrate a number of ways in which the presently described embodiments provide for improvements that enhance driver safety in an autonomous or semi-autonomous vehicle setting. For example, the presently described embodiments provide for semi-autonomous function distribution. While autonomous vehicle is being driven manually, the proposed system will be receiving Brain Computer Interface (BCI) signals from the driver to understand driver's level of expectation from autonomous vehicle to perform any driving action in an autonomous manner, and accordingly the vehicle will be identifying which driving actions are be taken by the autonomous vehicle and which action will be controlled by the driver.

The presently described embodiments also provide improvements in the form of detecting predictive needs for ambiguity resolution. If the autonomous vehicle is being driven manually, then based on the various driving context, predicted road condition etc, the vehicle will be predicting when there will be an ambiguity between the driver's expectation on the autonomous vehicle to take appropriate driving action, and the autonomous vehicle to takes the action, and accordingly the autonomous vehicle will recommend that the driver wear the BCI device to capture brain waves of the driver to resolve the ambiguity.

The presently described embodiments also provide for improved attentive forecasting handover. While autonomous vehicle is driven manually, the BCI device will be receiving electrical signals from the brain of the driver and from historical learning and the proposed system will be predicting when the driver might lose attention. Accordingly the proposed system will dynamically be taking appropriate autonomous control of the autonomous vehicle.

The presently described embodiments also provide for improved driver positional awareness. The autonomous vehicle will be distinguishing between the BCI signals received from a person present in driver seat and compare these to contextual data regarding the passenger seats and other nearby objects or people. Accordingly the proposed system will be identifying which brain wave signals will be considered for different degree of manual and autonomous driving.

The presently described embodiments also provide for improved dynamic control selection. Based on the BCI signal from the driver and the behavior of the driver, the proposed system will be predicting which controls are to be taken by the autonomous vehicles and accordingly autonomous vehicle will proactively be taken the control with autonomous driving.

Lastly, the presently described embodiments also provide for improved contextual monitoring and adjustment. Based on historically gathered information from BCI signals, driver's driving behavior, and changes in BCI signals based on surrounding driving context, the proposed system will be predicting any change in contextual situation, and whether the detected BCI signals and predicted expectation will result in a safe or unsafe situation, and accordingly the autonomous vehicle will proactively be taking the driving controls.

It may be appreciated that FIGS. 2-3 provide only illustrations of an exemplary implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of automatically executing a driver's expectations of an autonomous vehicle, the method comprising:

automatically establishing a connection between an autonomous vehicle, and a brain computer interface (BCI) device worn by a driver of the autonomous vehicle;

automatically utilizing sensors and the BCI device to gather contextual data;

automatically processing the contextual data and conducting predictive determinations based on correlated driver behavior;

automatically detecting a traffic context, and continuously detecting and monitoring upcoming traffic environments, further comprising automatically detecting any lack of sufficient information to make a decision regarding automated driving for the traffic context, and, in response to detecting the lack of sufficient information, automatically prompting the driver to wear the BCI device;

automatically generating a predicted driver expectation for the traffic context;

in response to detecting that the predicted driver expectation for the traffic context is safe, automatically executing the predicted driver expectation; and in response to detecting that the predicted driver expectation for the traffic context is unsafe, automatically executing a safety remedial action.

2. The computer-based method of claim 1, wherein the BCI device comprises a wearable cap.

3. The computer-based method of claim 1, further comprising:

automatically capturing the gathered contextual data in a knowledge corpus to generate historical driving data.

4. The computer-based method of claim 1, wherein the predicted driver expectation for the traffic context is generated by utilizing machine learning algorithms that incorporate one or more of inductive logic programming, cluster analysis, support vector machines, or Naïve Bayes classifiers.

5. The computer-based method of claim 1, wherein the safety remedial action comprises sending a warning to the driver.

6. The computer-based method of claim 1, wherein the safety remedial action comprises having the autonomous vehicle take control of driving from the driver to either execute the predicted driver expectation or to make a safe stop.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

automatically establishing a connection between an autonomous vehicle, and a brain computer interface (BCI) device worn by a driver of the autonomous vehicle;

automatically utilizing sensors and the BCI device to gather contextual data;

automatically processing the contextual data and conducting predictive determinations based on correlated driver behavior;

automatically detecting a traffic context, and continuously detecting and monitoring upcoming traffic environments, further comprising automatically detecting any lack of sufficient information to make a decision regarding automated driving for the traffic context, and, in response to detecting the lack of sufficient information, automatically prompting the driver to wear the BCI device;

automatically generating a predicted driver expectation for the traffic context;

in response to detecting that the predicted driver expectation for the traffic context is safe, automatically executing the predicted driver expectation; and in response to detecting that the predicted driver expectation for the traffic context is unsafe, automatically executing a safety remedial action.

8. The computer system of claim 7, wherein the BCI device comprises a wearable cap.

9. The computer system of claim 7, further comprising:

automatically capturing the gathered contextual data in a knowledge corpus to generate historical driving data.

10. The computer system of claim 7, wherein the predicted driver expectation for the traffic context is generated by utilizing machine learning algorithms that incorporate one or more of inductive logic programming, cluster analysis, support vector machines, or Naïve Bayes classifiers.

11. The computer system of claim 7, wherein the safety remedial action comprises sending a warning to the driver.

12. The computer system of claim 7, wherein the safety remedial action comprises having the autonomous vehicle take control of driving from the driver to either execute the predicted driver expectation or to make a safe stop.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

automatically establishing a connection between an autonomous vehicle, and a brain computer interface (BCI) device worn by a driver of the autonomous vehicle;

automatically utilizing sensors and the BCI device to gather contextual data;

automatically processing the contextual data and conducting predictive determinations based on correlated driver behavior;

automatically detecting a traffic context, and continuously detecting and monitoring upcoming traffic environments, further comprising automatically detecting any lack of sufficient information to make a decision regarding automated driving for the traffic context, and, in response to detecting the lack of sufficient information, automatically prompting the driver to wear the BCI device;

automatically generating a predicted driver expectation for the traffic context;

in response to detecting that the predicted driver expectation for the traffic context is safe, automatically executing the predicted driver expectation; and in response to detecting that the predicted driver expectation for the traffic context is unsafe, automatically executing a safety remedial action.

14. The computer program product of claim 13, wherein the BCI device comprises a wearable cap.

15. The computer program product of claim 13, further comprising:

automatically capturing the gathered contextual data in a knowledge corpus to generate historical driving data.

16. The computer program product of claim 13, wherein the predicted driver expectation for the traffic context is generated by utilizing machine learning algorithms that incorporate one or more of inductive logic programming, cluster analysis, support vector machines, or Naïve Bayes classifiers.

17. The computer program product of claim 13, wherein the safety remedial action comprises sending a warning to the driver.

* * * * *